US011927355B2

(12) United States Patent
Hirai et al.

(10) Patent No.: US 11,927,355 B2
(45) Date of Patent: Mar. 12, 2024

(54) AIR CONDITIONING AND VENTILATING SYSTEM

(71) Applicant: DAIKIN INDUSTRIES, LTD., Osaka (JP)

(72) Inventors: Kousuke Hirai, Osaka (JP); Akiyoshi Yamamoto, Osaka (JP); Gakuto Sakai, Osaka (JP); Tooru Fujimoto, Osaka (JP); Yoshitaka Matsugi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/700,617

(22) Filed: Mar. 22, 2022

(65) Prior Publication Data

US 2022/0214062 A1    Jul. 7, 2022

Related U.S. Application Data

(63) Continuation of application No. PCT/JP2020/035477, filed on Sep. 18, 2020.

(30) Foreign Application Priority Data

Sep. 30, 2019  (JP) .................................. 2019-179821

(51) Int. Cl.
*F24F 11/36* (2018.01)
*F24F 11/52* (2018.01)
*F24F 11/77* (2018.01)

(52) U.S. Cl.
CPC .............. *F24F 11/36* (2018.01); *F24F 11/52* (2018.01); *F24F 11/77* (2018.01); *G05B 2219/2614* (2013.01)

(58) Field of Classification Search
CPC .... F24F 11/52; F24F 11/77; G05B 2219/2614
See application file for complete search history.

(56) References Cited

U.S. PATENT DOCUMENTS

11,280,508 B1 *   3/2022  Kraft ........................ F24F 11/49
2015/0241076 A1   8/2015  Eguchi et al.
(Continued)

FOREIGN PATENT DOCUMENTS

EP    2 589 900 A1    5/2013
JP    4-309744 A     11/1992
(Continued)

OTHER PUBLICATIONS

Extended European Search Report for corresponding European Application No. 20872297.5, dated Oct. 11, 2022.
(Continued)

*Primary Examiner* — Mohammad Ali
*Assistant Examiner* — Vincent W Chang
(74) *Attorney, Agent, or Firm* — Birch, Stewart, Kolasch & Birch, LLP

(57) ABSTRACT

An air conditioning and ventilating system including: an air conditioning device including a heat exchanger configured to generate conditioned air by heat exchange with a refrigerant; a ventilation device communicatively connected to the air conditioning device and including a supply air fan and/or an exhaust fan; an airflow volume detection unit configured to detect an airflow volume equivalent value of the ventilation device; and a control unit. On determination that the airflow volume equivalent value acquired from the airflow volume detection unit is equal to or less than a first predetermined value, the control unit sets an operation of the air conditioning device to a stop state.

9 Claims, 7 Drawing Sheets

(56) References Cited

U.S. PATENT DOCUMENTS

| | | | | |
|---|---|---|---|---|
| 2017/0350614 A1* | 12/2017 | Nagaoka | ............... | F24F 1/0014 |
| 2018/0045424 A1* | 2/2018 | Yajima | ................... | F24F 7/007 |
| 2020/0124305 A1* | 4/2020 | Goel | ........................ | F24F 11/74 |
| 2020/0132321 A1* | 4/2020 | Blanton | ................... | F24F 11/77 |
| 2022/0186960 A1* | 6/2022 | Hirai | ....................... | F24F 7/007 |

FOREIGN PATENT DOCUMENTS

| | | | |
|---|---|---|---|
| JP | 2009-109116 | A | 5/2009 |
| JP | 2010-31680 | A | 2/2010 |
| JP | 2014-77584 | A | 5/2014 |
| JP | 2016-211826 | A | 12/2016 |
| JP | 2016-223643 | A | 12/2016 |

OTHER PUBLICATIONS

International Preliminary Report on Patentability and English translation of the Written Opinion of the International Searching Authority for International Application No. PCT/JP2020/035477, dated Apr. 14, 2022.

International Search Report, issued in PCT/JP2020/035477, dated Dec. 1, 2020.

Written Opinion of the International Searching Authority, issued in PCT/JP2020/035477, dated Dec. 1, 2020.

* cited by examiner

AIR CONDITIONING AND VENTILATING SYSTEM

CROSS REFERENCE TO RELATED APPLICATIONS

This application is a Continuation of PCT International Application No. PCT/JP2020/035477, filed on Sep. 18, 2020, which claims priority under 35 U.S.C. 119(a) to Patent Application No. 2019-179821, filed in Japan on Sep. 30, 2019, all of which are hereby expressly incorporated by reference into the present application.

TECHNICAL FIELD

The present disclosure relates to air conditioning and ventilating systems. In more detail, the present disclosure relates to an air conditioning and ventilating system including an air conditioning device and a ventilation device.

BACKGROUND ART

In relatively large buildings such as office buildings and hotels, an air conditioning device that generates cold air and hot air, and a ventilation device that supplies outside air into the room and exhausts air from the room are usually used together.

If a refrigerant leaks from the air conditioning device into the room, an oxygen deficiency or other inconveniences may occur. To prevent an occurrence of such an inconvenience, it has conventionally been proposed to activate the ventilation device when refrigerant leakage is detected (see, for example, Patent Literature 1).

In the air conditioning and ventilating system described in Patent Literature 1, when refrigerant leakage is detected while an air conditioning device is connected to a ventilation device to communicate with each other, a control device of the air conditioning device instructs a control device of the ventilation device to operate the ventilation device. Then, if a trouble of the ventilation device or the like causes a shortage of airflow volume of the ventilation device, the control device of the air conditioning device increases the airflow volume of the air conditioning device. This inhibits the leaked refrigerant from accumulating in air conditioned space and causing insufficient discharge of the refrigerant.

CITATION LIST

Patent Literature

PATENT LITERATURE 1: Japanese Unexamined Patent Publication No. 2016-223643

SUMMARY

An air conditioning and ventilating system according to the present disclosure includes:
  an air conditioning device including a heat exchanger configured to generate conditioned air by heat exchange with a refrigerant;
  a ventilation device communicatively connected to the air conditioning device and including a supply air fan and/or an exhaust fan;
  an airflow volume detection unit configured to detect an airflow volume equivalent value of the ventilation device; and
  a control unit,
in which on determination that the airflow volume equivalent value acquired from the airflow volume detection unit is equal to or less than a first predetermined value, the control unit sets an operation of the air conditioning device to a stop state.

DETAILED DESCRIPTION

An air conditioning and ventilating system according to the present disclosure will be described in detail below with reference to the accompanying drawings. Note that the present disclosure is not limited to the following exemplification, but is intended to include all changes within meanings and a scope of claims and equivalents.

[Overall Configuration of Air Conditioning and Ventilating System]

Figure 1:
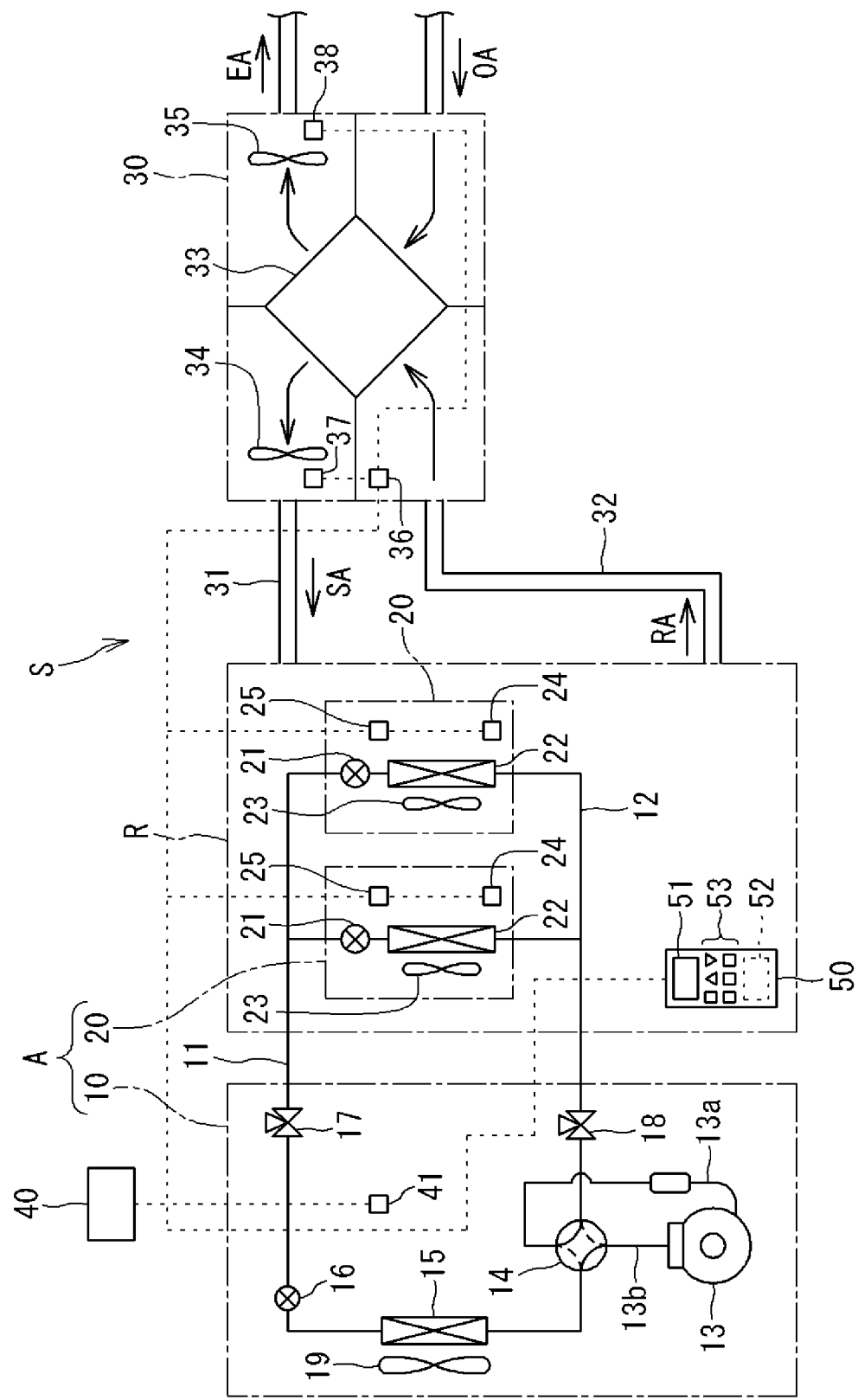
FIG. 1 is an explanatory diagram of a refrigerant pipe system and an air system of one embodiment of an air conditioning and ventilating system of the present disclosure.

FIG. 1 is an explanatory diagram showing a refrigerant pipe system and an air system of an air conditioning and ventilating system S according to one embodiment of the present disclosure. The air conditioning and ventilating system S includes a refrigerant pipe method distributed air conditioning device. The air conditioning and ventilating system S cools and heats a room R by executing a vapor compression refrigeration cycle operation, and ventilates the room R by the ventilation device to be described later.

The type of room R, which is air conditioned space to which the air conditioning and ventilating system S is applied, is not particularly limited in the present disclosure, and includes all spaces or areas that are cooled and/or heated and ventilated, such as offices, hotels, theaters, and stores. The air conditioning and ventilating system S includes an outdoor (heat source) unit 10 installed outside the room R, indoor units 20, which are air conditioning devices installed inside the room R, a ventilation device 30, and a central controller 40. The outdoor unit 10 and the indoor units 20 constitute an air conditioning device A. The outdoor unit 10 and the indoor units 20 are connected by a liquid refrigerant connection pipe 11 and a gas refrigerant connection pipe 12. In addition, the ventilation device 30 and the room R are connected by a supply air (SA) duct 31 and a return air (RA) duct 32. In the room R, the indoor units 20 may be installed on a floor, near a ceiling, or in ceiling space. Note that FIG. 1 depicts only two indoor units 20, but the number of indoor units 20 may be one, or three or more. In addition, in the embodiment shown in FIG. 1, one outdoor unit 10 is connected to the indoor units 20 of the room R, which is one air conditioned space, but one outdoor unit 10 may be connected to a plurality of indoor units disposed in a plurality of rooms R. In this case, the ventilation device is disposed in each room.

Figure 2:
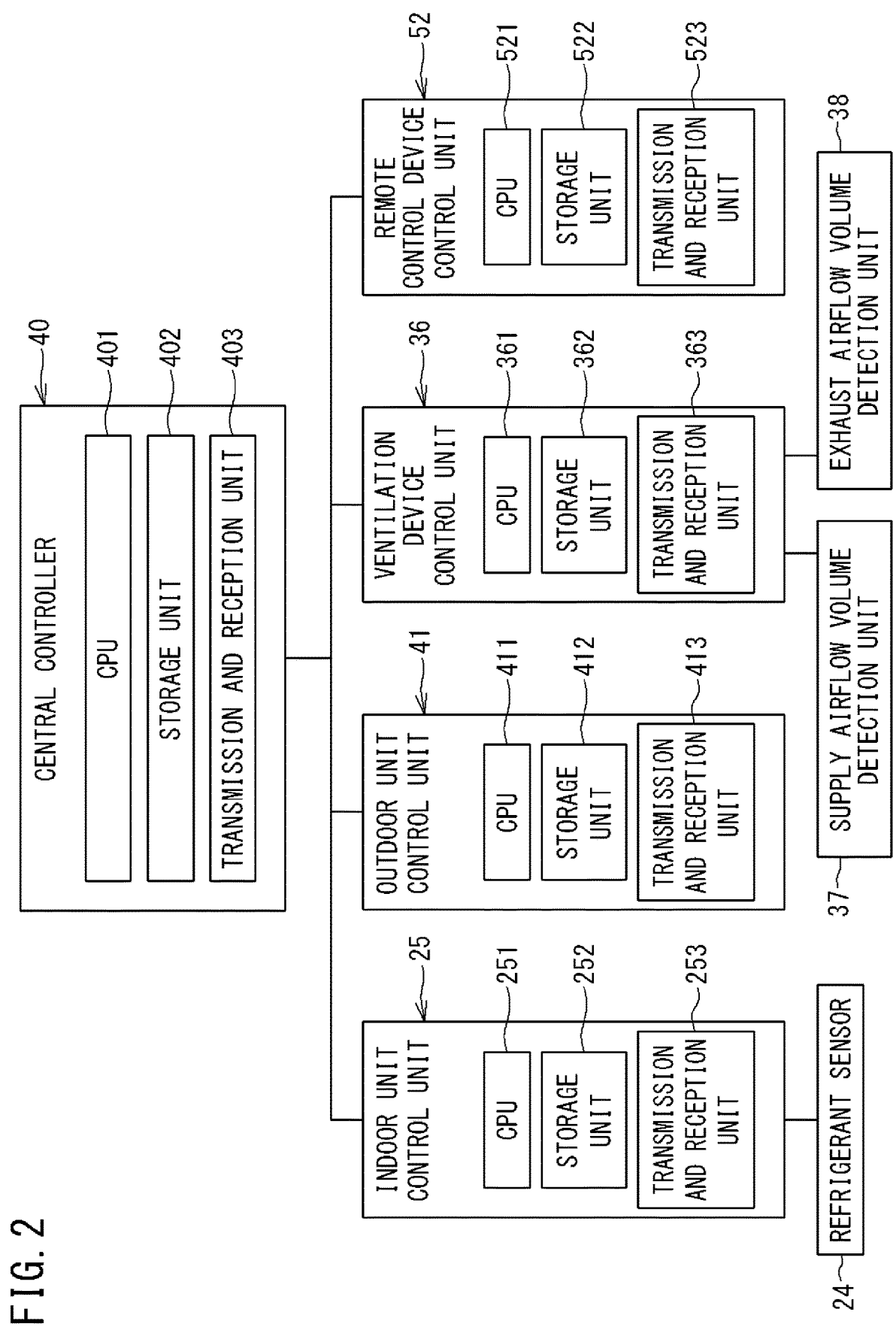
FIG. 2 is a block diagram showing configurations of a central controller and control units of an outdoor unit, an indoor unit, a ventilation device, and a remote control device.

The central controller 40 includes a CPU 401, a storage unit 402, and a transmission and reception unit 403, as shown in FIG. 2. The central controller 40 communicates with control units of the outdoor unit 10, the indoor units 20, and the ventilation device 30 to be described later via the transmission and reception unit 403 to control the operation of each device.

The outdoor unit 10 and the indoor units 20 can execute air conditioning of the room R by executing a well-known refrigeration cycle operation. Note that detailed description of a well-known refrigerant circuit inside each of the outdoor unit 10 and the indoor units 20 will be omitted, and only parts related to the present disclosure will be described below.

The outdoor unit 10 includes a compressor 13, a four-way switching valve 14, an outdoor heat exchanger 15, an outdoor expansion valve 16, a liquid shutoff valve 17, a gas shutoff valve 18, an outdoor fan 19, and a control unit 41. In the air conditioning and ventilating system S according to the present embodiment, the outdoor unit 10, the two indoor units 20, and the ventilation device 30 are communicably connected to each other.

The compressor 13 is a hermetic type compressor driven by a motor for the compressor (not shown), and takes in a gas refrigerant from an intake flow path 13a on an intake side of the compressor 13.

The four-way switching valve 14 is a mechanism for switching a refrigerant flow direction. As indicated by solid lines in FIG. 1, during a cooling operation, the four-way switching valve 14 connects a refrigerant pipe 13b on a discharge side of the compressor 13 to one end of the outdoor heat exchanger 15, and connects the intake flow path 13a on the intake side of the compressor 13 to the gas shutoff valve 18. With this configuration, the outdoor heat exchanger 15 functions as a condenser for the refrigerant compressed by the compressor 13, and an indoor heat exchanger to be described later functions as an evaporator for the refrigerant condensed by the outdoor heat exchanger 15.

In addition, as indicated by broken lines in FIG. 1, during a heating operation, the four-way switching valve 14 connects the refrigerant pipe 13b on the discharge side of the compressor 13 to the gas shutoff valve 18, and connects the intake flow path 13a to one end of the outdoor heat exchanger 15. With this configuration, the indoor heat exchanger functions as a condenser for the refrigerant compressed by the compressor 13, and the outdoor heat exchanger 15 functions as an evaporator for the refrigerant cooled by the indoor heat exchanger.

The outdoor fan 19 takes in outside air into the outdoor unit 10 and discharges, to the outdoors, outside air that has undergone heat exchange with the refrigerant flowing through the outdoor heat exchanger 15.

The control unit 41 includes a CPU 411, a storage unit 412, and a transmission and reception unit 413, as shown in FIG. 2. The control unit 41 is communicatively connected to the central controller 40 via the transmission and reception unit 413 to control the operation of the compressor 13 and the like.

The indoor units 20 are each connected to the outdoor unit 10 via the refrigerant connection pipes 11 and 12. The two indoor units 20 shown in FIG. 1 both have the same external and internal structure. Each indoor unit 20 includes an indoor expansion valve 21, an indoor heat exchanger 22, an indoor fan 23, a refrigerant sensor 24, and a control unit 25.

The indoor fan 23 takes in air of the room R into the indoor unit 20 and supplies conditioned air that has undergone heat exchange with the refrigerant flowing through the indoor heat exchanger 22 to the room R.

The refrigerant sensor 24 detects concentration of the refrigerant leaking from the refrigerant pipe or the like. The refrigerant sensor 24 continuously or intermittently outputs an electrical signal according to detected values to the control unit 25. This electrical signal varies in voltage according to the refrigerant concentration detected by the refrigerant sensor 24.

The location of the refrigerant sensor 24 is not particularly limited if the leaked refrigerant can be detected. The refrigerant sensor 24 is preferably disposed, for example, near a place where the refrigerant is likely to leak, such as a joint point between the refrigerant pipes, a place where the refrigerant pipe is curved at 90 degrees or more, and a place where the pipe is thin. Note that in addition to being disposed inside the indoor unit 20, the refrigerant sensor 24 can also be mounted, for example, in the remote controller described later to set the room temperature, airflow volume, or the like, or can be disposed on a wall surface or other suitable place in the room.

The control unit 25 includes a CPU 251, a storage unit 252, and a transmission and reception unit 253, as shown in FIG. 2. The control unit 25 is communicatively connected to the central controller 40 via the transmission and reception unit 253. The control unit 25 controls the operation of the indoor fan 23 and the like in the indoor unit 20. The control unit 25 receives an electrical signal from the refrigerant sensor 24 via the transmission and reception unit 253.

The ventilation device 30 exchanges heat with fresh outside air OA and supplies the air to the room R as supply air SA, and discharges the return air RA from the room R to the outside of the device. The ventilation device 30 includes a total heat exchanger 33, a supply air fan 34, an exhaust fan 35, a control unit 36, a supply airflow volume detection unit 37, and an exhaust airflow volume detection unit 38.

Figure 3:
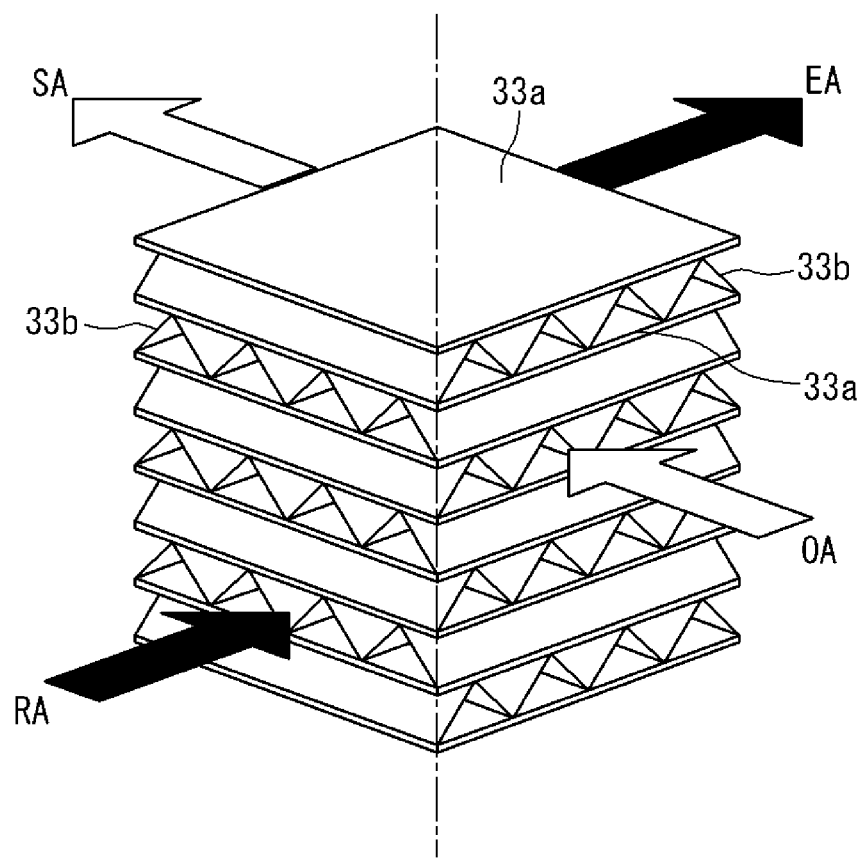
FIG. 3 is a perspective explanatory diagram showing a configuration of a total heat exchanger in the ventilation device.

The total heat exchanger 33 in the present embodiment is an orthogonal total heat exchanger configured such that the outside air OA from outside the room and the return air RA from inside the room are almost orthogonal. The total heat exchanger 33 is, as shown in FIG. 3, a laminated body of a thermally conductive and moisture-permeable flat plate-shaped partition plate 33a, and a corrugated spacing plate 33b laminated in turn in the up-and-down direction in FIG. 3. The spacing plate 33b has a cross section that looks like nearly triangular cross sections arranged side by side when viewed from the ventilation direction (direction indicated by the hollow arrow or black arrow in FIG. 3), and keeps the flow path height by the height of the triangle. The spacing plate 33b is laminated at an angle of 90 degrees different at each sheet such that a corrugated cross section appears on every other sheet in the up-and-down direction (up-and-down direction in FIG. 3) on a certain side with the partition plate 33a interposed therebetween. With this configuration, a supply air side passage (see the hollow arrow in FIG. 3) and an exhaust side passage (see black arrow in FIG. 3) are formed with the thermally conductive and moisture-permeable partition plate 33a interposed therebetween. Sensible heat and latent heat are exchanged via the partition plate 33a. The ventilation device 30 in the present embodiment is a class 1 ventilation device in which air is supplied by a fan and exhausted by a fan. Note that as the ventilation device in the present disclosure, a class 2 ventilation device may be used, in which air is supplied by a fan and exhausted naturally, or a class 3 ventilation device may be used, in which air is exhausted by a fan and supplied naturally.

The control unit 36 includes a CPU 361, a storage unit 362, and a transmission and reception unit 363, as shown in FIG. 2. The control unit 36 is communicatively connected to the central controller 40, the supply airflow volume detection unit 37, and the exhaust airflow volume detection unit 38 via the transmission and reception unit 363. The supply airflow volume detection unit 37 detects an airflow volume equivalent value of the supply air fan 34. The exhaust airflow volume detection unit 38 detects an airflow volume equivalent value of the exhaust fan 35. The supply airflow volume detection unit 37 and the exhaust airflow volume detection unit 38 may be airflow volume sensors that detect the airflow volume of the supply air fan 34 and the exhaust fan 35. If the airflow volume sensor is used, the airflow volume equivalent value may be, for example, a voltage value corresponding to the airflow volume.

In the ventilation device 30 in the present embodiment, the control unit 36 executes fixed airflow volume control that adjusts the number of revolutions of each of the supply air fan 34 and the exhaust fan 35 to cause a supply airflow volume and exhaust airflow volume to approach respective target values. The storage unit 362 stores a target supply airflow volume, which is a target value for the supply airflow volume, and a target exhaust airflow volume, which is a target value for the exhaust airflow volume. When the airflow volume sensors are used as the supply airflow volume detection unit 37 and the exhaust airflow volume detection unit 38, the target supply airflow volume and the target exhaust airflow volume stored in the storage unit 362 are voltage values according to respective airflow volumes. The control unit 36 executes the fixed airflow volume control by referring to the target supply airflow volume and the target exhaust airflow volume stored in the storage unit 362 based on a supply airflow volume equivalent value and an exhaust airflow volume equivalent value detected by the supply airflow volume detection unit 37 and the exhaust airflow volume detection unit 38, respectively. In addition, the storage unit 362 stores the number of revolutions of the supply air fan 34 and the exhaust fan 35 at the start of operation of the ventilation device 30. The number of revolutions at the initial start of operation may be the number of revolutions determined at the time of trial operation, or may be the preset number of revolutions. The number of revolutions at the second and subsequent start of operation may be the preset number of revolutions, or the final number of revolutions at the previous operation may be stored.

In the present embodiment, a remote controller 50 is disposed in the room R. The remote controller 50 includes a display unit 51, a control unit 52, and an input unit 53. The display unit 51 displays information such as the operating mode of the indoor unit 20 and the room temperature, and also functions as an alarm unit for issuing (displaying) alarms and advance alarms as described below. The control unit 52 includes a CPU 521, a storage unit 522, and a transmission and reception unit 523, as shown in FIG. 2. The control unit 52 is communicatively connected to the control units 25 of the two indoor units 20, the control unit 36 of the ventilation device 30, and the central controller 40 via the transmission and reception unit 523 to control the operation of the remote controller 50. By manipulating the input unit 53, the user can adjust the temperature, start and stop the device operation, and the like.

The central controller 40 and the control units 25, 36, 41, and 52 each include a computer (CPU), and implement necessary control functions by the computer executing software (computer program). The software is stored in the storage unit of each of the central controller 40 and the control units 25, 36, 41, and 52. The central controller 40 and the control units 25, 36, 41, and 52 are connected to each other by communication lines, making it possible to coordinate control and share information.

[Basic Operation of Air Conditioning Device A]

The air conditioning device A having the above-described configuration executes the cooling operation or heating operation as follows.

During the cooling operation, as described above, the four-way switching valve 14 is in the state shown by the solid lines in FIG. 1. In this state, the high-pressure gas refrigerant discharged from the compressor 13 is sent to the outdoor heat exchanger 15 that functions as a condenser via the four-way switching valve 14, and is cooled by exchanging heat with the outside air supplied by the outdoor fan 19. The high-pressure refrigerant cooled and liquefied in the outdoor heat exchanger 15 is sent to each indoor unit 20 via the liquid-refrigerant connection pipe 11. The refrigerant sent to each indoor unit 20 is decompressed by the indoor expansion valve 21 to become a low-pressure gas-liquid two-phase state refrigerant, exchanges heat with the air of the room R in the indoor heat exchanger 22 that functions as an evaporator, and evaporates to become a low-pressure gas refrigerant. The low-pressure gas refrigerant heated in the indoor heat exchanger 22 is sent to the outdoor unit 10 via the gas-refrigerant connection pipe 12, and is taken in again into the compressor 13 via the four-way switching valve 14.

On the other hand, during the heating operation, as described above, the four-way switching valve 14 is in the state shown by the broken lines in FIG. 1. In this state, the high-pressure gas refrigerant discharged from the compressor 13 is sent to each indoor unit 20 via the four-way switching valve 14 and the gas-refrigerant connection pipe 12. The high-pressure gas refrigerant sent to each indoor unit 20 is sent to the indoor heat exchanger 22 that functions as a condenser, cooled by exchanging heat with the air of the room R, passes through the indoor expansion valve 21, and is sent to the outdoor unit 10 via the liquid-refrigerant connection pipe 11. The high-pressure refrigerant sent to the outdoor unit 10 is decompressed by the outdoor expansion valve 16 to become the low-pressure gas-liquid two-phase state refrigerant, and flows into the outdoor heat exchanger 15 that functions as an evaporator. The low-pressure gas-liquid two-phase state refrigerant that has flowed into the outdoor heat exchanger 15 is heated by exchanging heat with the outside air supplied by the outdoor fan 19, and evaporates to become a low-pressure refrigerant. The low-pressure gas refrigerant leaving the outdoor heat exchanger 15 is taken in again into the compressor 13 via the four-way switching valve 14.

[Basic Operation of Ventilation Device 30]

The ventilation device 30 is linked to the operation of the air conditioning device A. When the operation of the air conditioning device A is started, the operation of the ventilation device 30 is also started, and when the operation of the air conditioning device A is stopped, the operation of the ventilation device 30 is also stopped.

Figure 4:
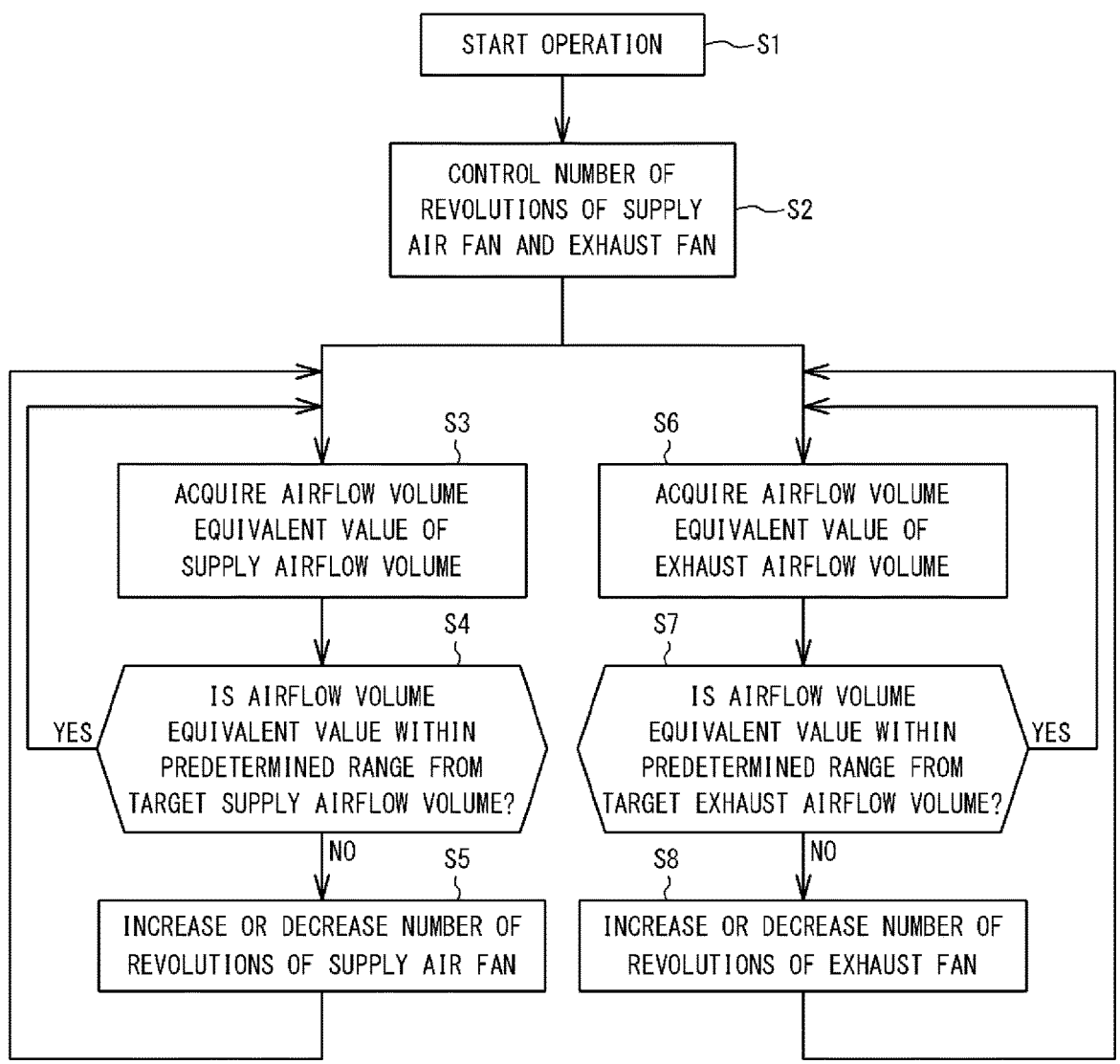
FIG. 4 is a flowchart showing one example of activation of the ventilation device.

The control unit 36 executes the above-described fixed airflow volume control. Specifically, as shown in FIG. 4, the following control is executed.

In step S1, the CPU 361 of the control unit 36 of the ventilation device 30 starts the operation of the ventilation device 30 in conjunction with the operation of the air conditioning device A.

In step S2, the CPU 361 controls the number of revolutions of each of the supply air fan 34 and the exhaust fan 35 in order to reach the predetermined rotation stored in the storage unit 362.

In step S3, the supply airflow volume detection unit 37 acquires the airflow volume equivalent value of the supply airflow volume and transmits the acquired airflow volume equivalent value to the control unit 36.

In step S4, the CPU 361 of the control unit 36 compares the acquired airflow volume equivalent value of the supply airflow volume with the target supply airflow volume stored in the storage unit 362, and determines whether the airflow volume equivalent value is within a predetermined range from the target supply airflow volume. On determination that the airflow volume equivalent value is within the predetermined range from the target supply airflow volume, the CPU 361 returns to step S3.

On the other hand, in step S4, on determination that the airflow volume equivalent value is not within the predetermined range from the target supply airflow volume, the CPU 361 of the control unit 36 proceeds to step S5.

In step S5, when the airflow volume equivalent value is lower than the target supply airflow volume beyond the predetermined range, the CPU 361 of the control unit 36 increases the number of revolutions of the supply air fan 34 over the current number of revolutions based on the current airflow volume equivalent value. In addition, when the airflow volume equivalent value is higher than the target supply airflow volume beyond the predetermined range, the CPU 361 decreases the number of revolutions of the supply air fan 34 over the current number of revolutions based on the current airflow volume equivalent value.

In step S6 parallel with step S3, the exhaust airflow volume detection unit 38 acquires the airflow volume equivalent value of the exhaust airflow volume and transmits the acquired airflow volume equivalent value to the control unit 36.

In step S7, the CPU 361 of the control unit 36 compares the acquired airflow volume equivalent value of the exhaust airflow volume with the target exhaust airflow volume stored in the storage unit 362, and determines whether the airflow volume equivalent value is within a predetermined range from the target exhaust airflow volume. On determination that the airflow volume equivalent value is within the predetermined range from the target exhaust airflow volume, the CPU 361 returns to step S6.

On the other hand, in step S7, on determination that the airflow volume equivalent value is not within the predetermined range from the target exhaust airflow volume, the CPU 361 of the control unit 36 proceeds to step S8.

In step S8, when the airflow volume equivalent value is lower than the target exhaust airflow volume beyond the predetermined range, the CPU 361 of the control unit 36 increases the number of revolutions of the exhaust fan 35 over the current number of revolutions based on the current airflow volume equivalent value. In addition, when the airflow volume equivalent value is higher than the target exhaust airflow volume beyond the predetermined range, the CPU 361 decreases the number of revolutions of the exhaust fan 35 over the current number of revolutions based on the current airflow volume equivalent value.

As described above, the ventilation device 30 is linked to the air conditioning device A. When the operation of the air conditioning device A is stopped, the operation of the ventilation device 30 is also stopped. On receipt of information that the operation of the air conditioning device A is stopped, directly from the control unit 25 of the indoor unit 20, or indirectly via the central controller 40, the CPU 361 of the control unit 36 stops the operation of the ventilation device 30 even during the processing of any of the steps shown in FIG. 4.

[Operation when Airflow Volume of Ventilation Device 30 Decreases]

Next, the operation of the air conditioning and ventilating system S when the airflow volume of the ventilation device 30 decreases will be described.

As described above, when the supply air volume and the exhaust air volume decrease during the fixed airflow volume control, the ventilation device 30 increases the supply air volume and the exhaust air volume by increasing the number of revolutions of the supply air fan 34 and the exhaust fan 35. However, an upper limit is set for the number of revolutions of each of the supply air fan 34 and the exhaust fan 35 of the ventilation device 30, and after the number of revolutions reaches the upper limit, the airflow volume cannot be increased any more. Therefore, the air conditioning and ventilating system S according to the present embodiment executes the following control when the number of revolutions of the supply air fan 34 and the exhaust fan 35 reaches the upper limit and the supply airflow volume and the exhaust airflow volume decrease equal to or less than the predetermined lower limit value.

Figure 5:
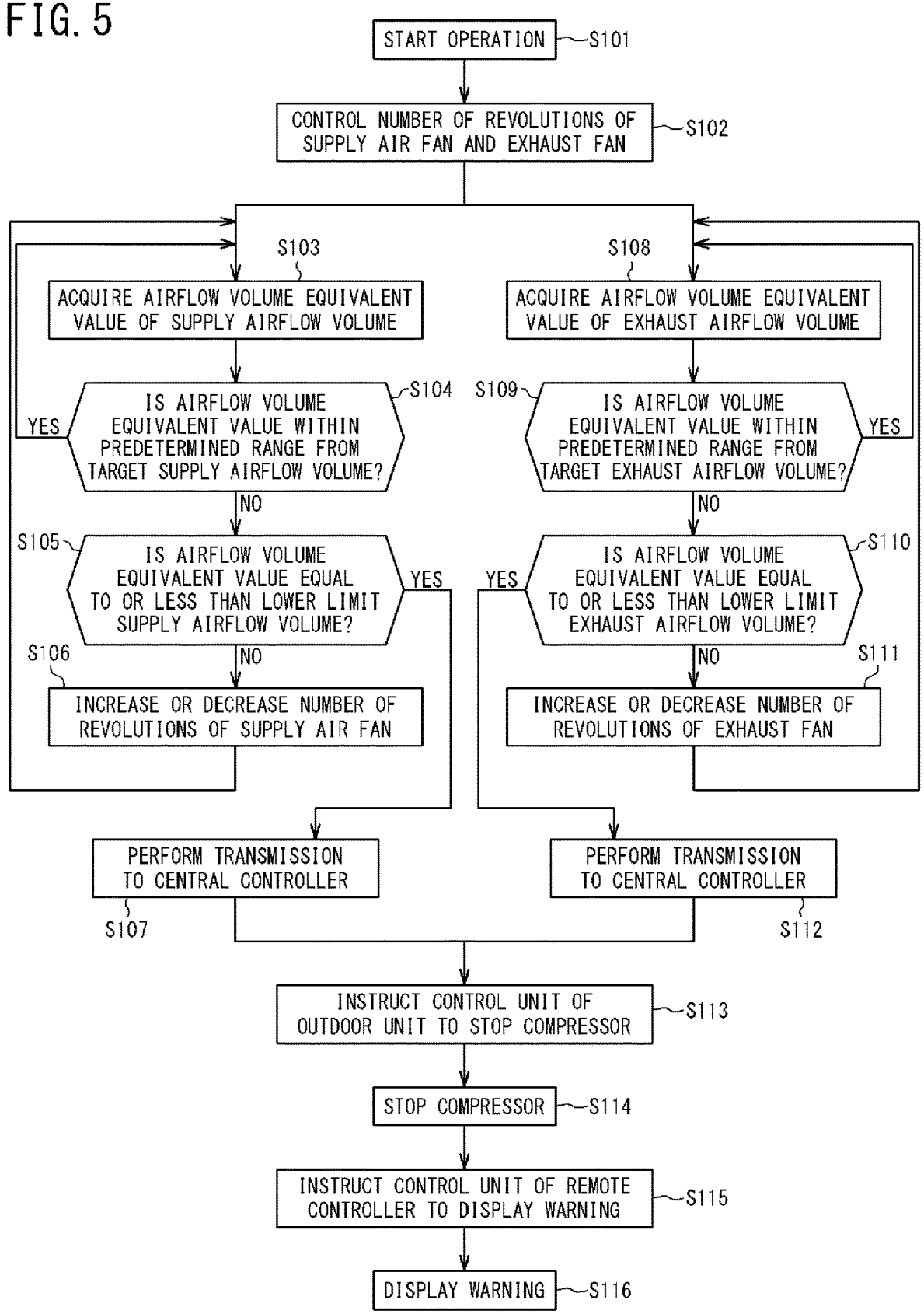
FIG. 5 is a flowchart showing another example of activation of the ventilation device.

In the flowchart shown in FIG. 5, step S101 to step S104 show the same process as in step S1 to step S4 in the flowchart shown in FIG. 4, respectively. In addition, step S108 and step S109 in FIG. 5 also show the same process as in step S6 and step S7 in FIG. 4, respectively. Therefore, for simplicity, descriptions of the same process are omitted.

In step S104, on determination that the airflow volume equivalent value is not within the predetermined range from the target supply airflow volume, in step S105, the CPU 361 of the control unit 36 determines whether the airflow volume equivalent value is equal to or less than the lower limit supply airflow volume. In step S105, on determination that the airflow volume equivalent value is higher than the lower limit supply airflow volume, the CPU 361 proceeds to step S106. In step S106, as in step S5 of FIG. 4, the CPU 361 increases or decreases the number of revolutions of the supply air fan 34 over the current number of revolutions based on the current airflow volume equivalent value, and then returns to step S103.

On the other hand, in step S105, on determination that the airflow volume equivalent value is equal to or less than the lower limit supply airflow volume, the CPU 361 of the control unit 36 proceeds to step S107 and sends a signal to the central controller 40 in step S107.

In step S109, on determination that the airflow volume equivalent value is not within the predetermined range from the target exhaust airflow volume, in step S110, the CPU 361 of the control unit 36 determines whether the airflow volume equivalent value is equal to or less than the lower limit exhaust airflow volume. In step S110, on determination that the airflow volume equivalent value is higher than the lower limit exhaust airflow volume, the CPU 361 proceeds to step S111. In step S111, as in step S5 of FIG. 4, the CPU 361 increases or decreases the number of revolutions of the exhaust fan 35 over the current number of revolutions based on the current airflow volume equivalent value, and then returns to step S108.

On the other hand, in step S110, on determination that the airflow volume equivalent value is equal to or less than the lower limit exhaust airflow volume, the CPU 361 of the control unit 36 proceeds to step S112 and sends a signal to the central controller 40 in step S112.

Step S108 to step S112 are performed in parallel with step S103 to step S107.

In step S113, on receipt of the signal from the control unit 36 that at least one of the supply airflow volume and the exhaust airflow volume has become equal to or less than the lower limit, the CPU 401 of the central controller 40 instructs the control unit 41 of the outdoor unit 10 to stop the operation of the compressor 13.

In step S114, on receipt of the instruction from the central controller 40, the CPU 411 of the control unit 41 of the outdoor unit 10 stops the operation of the compressor 13.

In step S115, the CPU 401 of the central controller 40 instructs the control unit 52 of the remote controller 50 to display a warning on the display unit 51 of the remote controller 50.

In step S116, on receipt of the instruction from the central controller 40, the CPU 521 of the control unit 52 causes the display unit 51 to display the warning.

This warning or alarm is performed by causing the display unit 51 to display a statement indicating that the ventilation airflow volume of the ventilation device 30 is decreasing or flashing a phrase such as "airflow volume of ventilation device has decreased" or a symbol indicating content thereof. By issuing an alarm by the display unit 51, a service technician or user can easily understand that the ventilation device 30 has a fault and does not secure normal ventilation airflow volume. This makes it possible to urge the service technician or user to solve the fault of the ventilation device 30. Then, solving the fault of the ventilation device 30 makes it possible to inhibit the shortage of the ventilation airflow volume if the refrigerant leaks.

The air conditioning and ventilating system S according to the present embodiment is, as described above, a class 1 ventilation device, which supplies air with the supply air fan and exhausts air with the exhaust fan. The "ventilation airflow volume" is a supply airflow volume or an exhaust airflow volume. In contrast, for a class 2 ventilation device, which supplies air with a fan and exhausts air naturally, the "ventilation airflow volume" refers to a supply airflow volume, or for a class 3 ventilation device, which exhausts air with a fan and supplies air naturally, the "ventilation airflow volume" refers to an exhaust airflow volume.

[Method for Calculating Lower Limit Supply Airflow Volume and Lower Limit Exhaust Airflow Volume (First Predetermined Value)]

The above-described "lower limit supply airflow volume" and "lower limit exhaust airflow volume" can be selected based on various guidelines that specify safety measures for a leaked refrigerant, and the like. For example, the IEC standard or GL-16 (JRA) defines the ventilation amount required to take safety measures against refrigerant leakage by ventilation. Note that the "lower limit supply airflow volume" and the "lower limit exhaust airflow volume" may have the same or different settings. Hereinafter, the "lower limit supply airflow volume" and the "lower limit exhaust airflow volume" are assumed to have the same settings and are referred to as the "first predetermined value."

The present embodiment sets the "first predetermined value" based on JRA GL-16:2017, which is a guideline set by the Japan Refrigeration and Air Conditioning Industry Association (JRAIA). The guideline stipulates that the ventilation device has ventilation capacity equal to or greater than the number of ventilations calculated by Formula (1) below as a safety measure against the leaked refrigerant.

$$n \geq 50/(G \times V) \quad (1)$$

Here, n is the number of ventilations (times/h), and G and V are LFL ($kg/m^3$) and room volume ($m^3$), respectively. LFL is the lower flammability limit, and is the minimum concentration of refrigerant that allows a flame to spread with the refrigerant and air uniformly mixed, as defined in ISO 817. For example, for the R32 refrigerant, LFL is 0.307 $kg/m^3$.

When the area and height of the room are 100 $m^3$ and 3 m respectively, the volume V of the room is 300 $m^3$. When R32 is used as a refrigerant, LFL of R32 is 0.307 $kg/m^3$, and thus the required number of ventilations n is equal to or greater than $50/(0.307 \times 300) = 0.543$ times/h from Formula (1). Therefore, the required ventilation capacity of this room (ventilation airflow volume) is 0.543 time/h×300 $m^3$/time=163 $m^3$/h or more.

The "first predetermined value" can be, for example, a value equal to or greater than the required ventilation capacity (ventilation airflow volume) calculated by Formula (1) above. When the value calculated in the above calculation example is the first predetermined value, the first predetermined value is 163 $m^3$/h. Therefore, when the control unit 36 determines that at least one of the supply airflow volume of the ventilation device 30 detected by the supply airflow volume detection unit 37 and the exhaust airflow volume of the ventilation device 30 detected by the exhaust airflow volume detection unit 38 is equal to or less than 163 $m^3$/h, the operation of the compressor 13 of the outdoor unit 10 is set to the stop state. That is, the operation of the compressor 13 in an operating state is stopped. In addition, the stop state of the compressor 13 that is not in an operating state is maintained.

Modification 1

Figure 6:
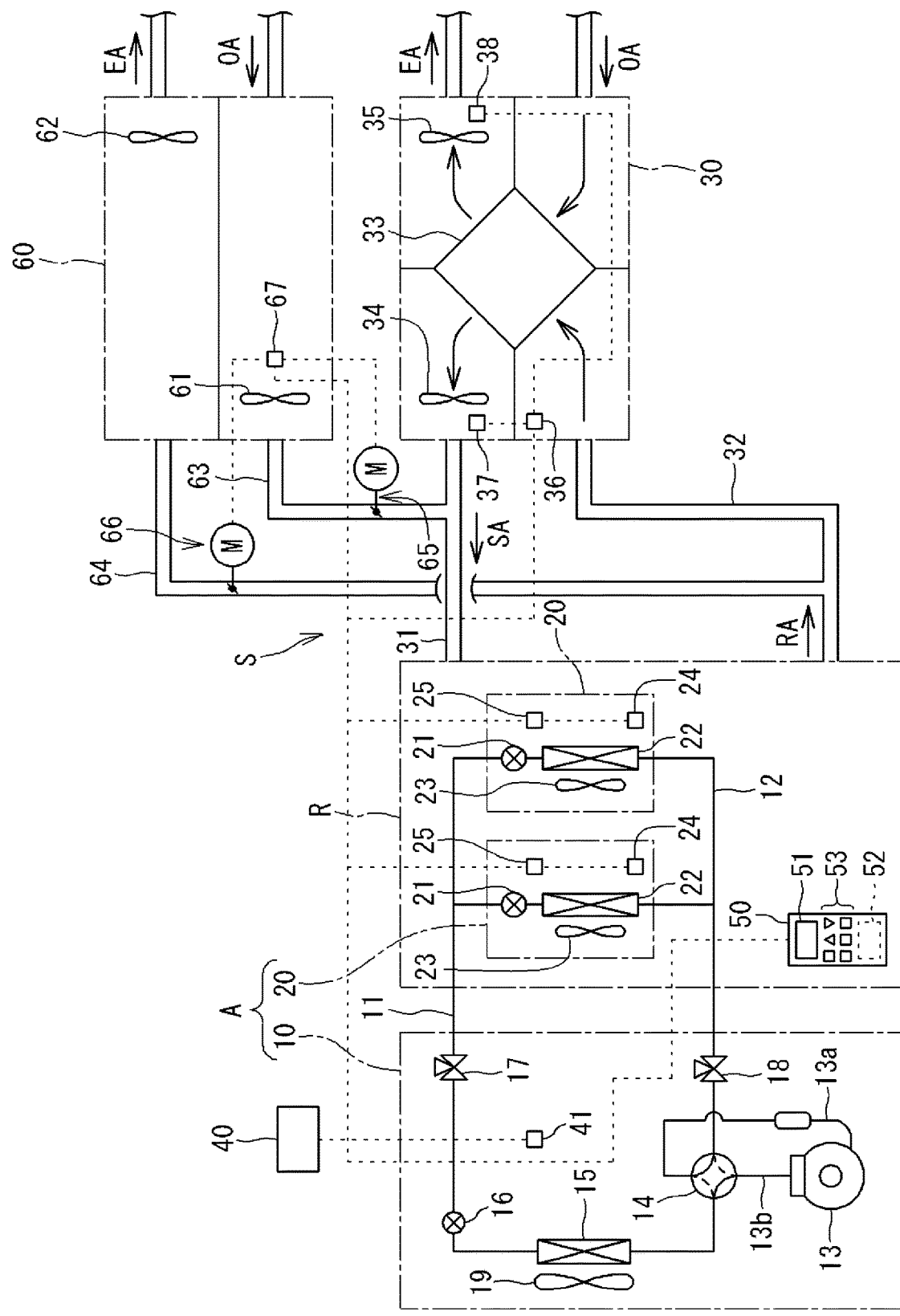
FIG. 6 is an explanatory diagram of a refrigerant pipe system and an air system of a modification of the air conditioning and ventilating system shown in FIG. 1.
Figure 7:
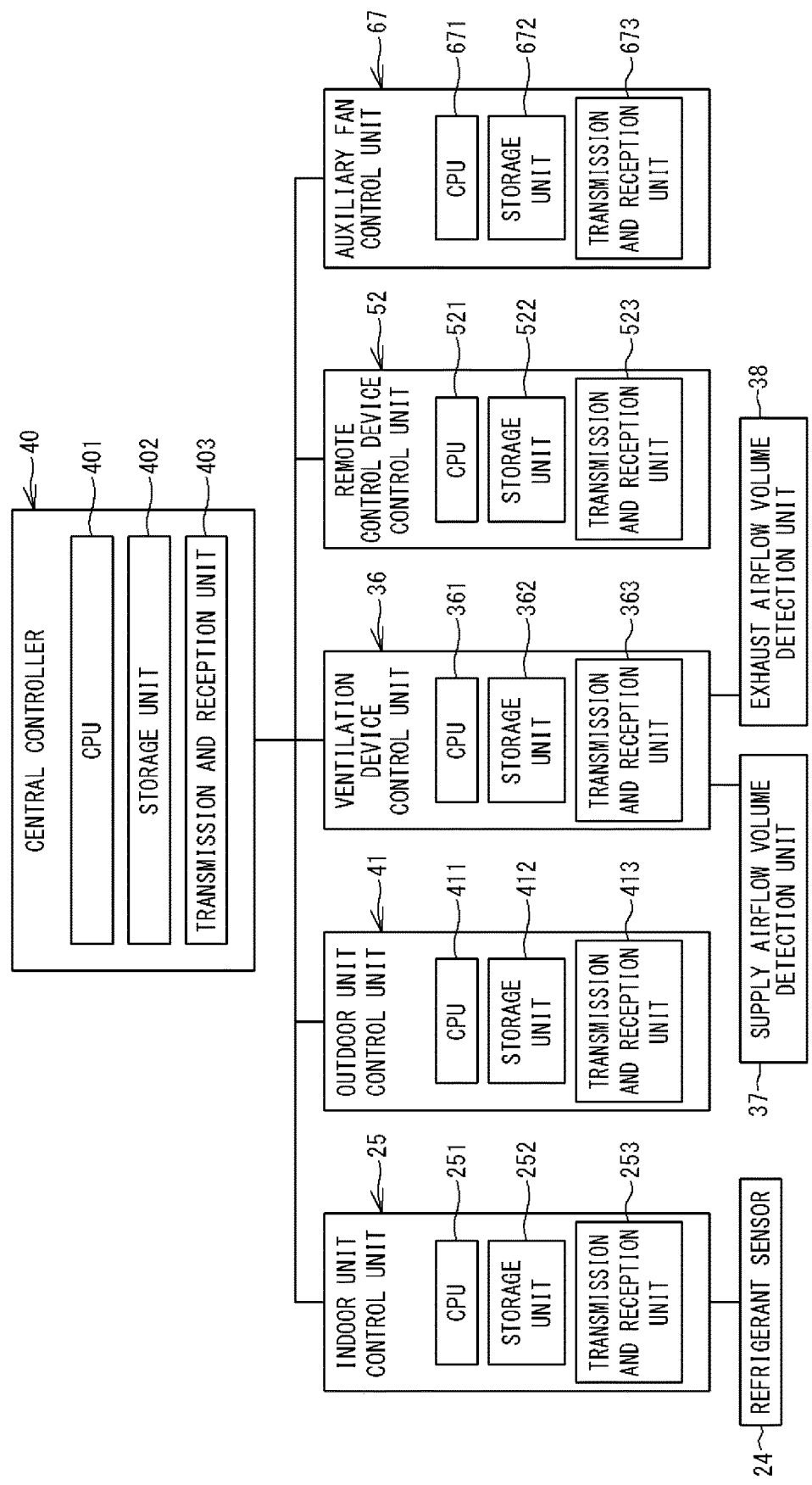
FIG. 7 is a block diagram showing configurations of the central controller, and control units of the outdoor unit, the indoor unit, the ventilation device, the remote control device, and an auxiliary fan in the air conditioning and ventilating system shown in FIG. 6.

In the air conditioning and ventilating system S in modification 1, an auxiliary fan 60 may be provided separately from the ventilation device 30 to assist supply air and exhaust by the ventilation device 30. FIG. 6 is an explanatory diagram of a refrigerant pipe system and an air system of the modification of the air conditioning and ventilating system S shown in FIG. 1 with the auxiliary fan 60 provided. In addition, FIG. 7 is a block diagram showing configurations of the central controller, and control units of the outdoor unit, the indoor unit, the ventilation device, the remote control device, and the auxiliary fan in the air conditioning and ventilating system shown in FIG. 6. In FIGS. 6 and 7, elements or configurations that are common to the elements or configurations shown in FIGS. 1 and 2 have the same reference symbols as in FIGS. 1 and 2, respectively, and the description thereof will be omitted for the sake of simplicity.

The auxiliary fan 60 is a ventilation fan disposed separately from the ventilation device 30. The auxiliary fan 60 includes an auxiliary supply air fan 61, an auxiliary exhaust fan 62, and a control unit 67. The auxiliary fan 60 and the room R are connected to each other by a blast duct 63 and a blast duct 64. The blast duct 63 is connected to a supply air duct 31 that connects the ventilation device 30 to the room R. The blast duct 64 is connected to a return air duct 32 that connects the ventilation device 30 to the room R. Inside the blast duct 63, an electric damper 65 that opens and closes the blast duct 63 is disposed. Inside the blast duct 64, an electric damper 66 that opens and closes the blast duct 64 is disposed. The control unit 67 controls the operation of the auxiliary supply air fan 61, the auxiliary exhaust fan 62, the electric damper 65, and the electric damper 66. The control unit 67 includes a CPU 671, a storage unit 672, and a transmission and reception unit 673, as shown in FIG. 7. The control unit 67 is communicatively connected to the central controller 40 via the transmission and reception unit 673. Note that the blast ducts 63 and 64 can also be connected directly to the room R without joining the supply air duct 31 and the return air duct 32 of the ventilation device 30, respectively.

[Operation of Auxiliary Fan 60 when Airflow Volume of Ventilation Device 30 Decreases]

In the present modification, when the determination in step S105 and step S110 in FIG. 5 is No, for example, the following control can be executed.

On determination in step S105 that the airflow volume equivalent value is higher than the lower limit supply airflow volume (determination in step S105 is No), the CPU 361 of the control unit 36 determines whether the airflow volume equivalent value is equal to or less than a second predetermined value. The second predetermined value is a value greater than the lower limit supply airflow volume. On determination that the airflow volume equivalent value is equal to or less than the second predetermined value, the CPU361 sends a signal to the central controller 40. On the other hand, on determination that the airflow volume equivalent value is not equal to or less than the second predetermined value, the CPU361 proceeds to step S106.

In addition, on determination in step S110 that the airflow volume equivalent value is higher than the lower limit exhaust airflow volume (determination in step S110 is No), the CPU 361 determines whether the airflow volume equivalent value is equal to or less than the second predetermined value. The second predetermined value is a value greater than the lower limit exhaust airflow volume. On determination that the airflow volume equivalent value is equal to or less than the second predetermined value, the CPU361 sends a signal to the central controller 40. On the other hand, on determination that the airflow volume equivalent value is not equal to or less than the second predetermined value, the CPU361 proceeds to step S111.

On receipt of the signal from the control unit 36 indicating that at least one of the supply airflow volume and the exhaust airflow volume is within the above-described range, the CPU 401 of the central controller 40 instructs the control unit 67 of the auxiliary fan 60 to start the operation. The control unit 67 starts the operation of the auxiliary fan 60. Specifically, since the auxiliary fan 60 includes the auxiliary supply air fan 61 and the auxiliary exhaust fan 62, the control unit 67 activates both the auxiliary supply air fan 61 and the auxiliary exhaust fan 62. Before the activation of the auxiliary supply air fan 61, the electric damper 65, which normally closes the blast duct 63, is opened. The air from the auxiliary supply air fan 61 is supplied to the room R along with the supply air SA from the ventilation device 30. In addition, before the activation of the auxiliary exhaust fan 62, the electric damper 66, which normally closes the blast duct 64, is opened. The return air RA from the room R is split into the ventilation device 30 and the auxiliary fan 60, and exhausted outside the room.

After the operation of the auxiliary fan 60 is started, the CPU 361 of the control unit 36 returns to steps S106 and S111. In the subsequent processing, the supply airflow volume is the sum of the supply airflow volume of the ventilation device 30 and the supply airflow volume of the auxiliary supply air fan 61. In addition, the exhaust airflow volume is the sum of the exhaust airflow volume of the ventilation device and the exhaust airflow volume of the auxiliary exhaust fan 62. The airflow volume of each of the auxiliary supply air fan 61 and the auxiliary exhaust fan 62 can also be determined by the same mechanism as the airflow volume detection units 37 and 38 of the ventilation device 30. When an auxiliary fan of fixed airflow volume is used to simplify the configuration, the fixed airflow volume may be set in advance.

After that, in step S105, on determination that the sum of the supply airflow volume of the ventilation device 30 and the supply airflow volume of the auxiliary supply air fan 61 is equal to or less than the lower limit supply airflow volume, the CPU 361 of the control unit 36 sends a signal to the central controller 40. In addition, in step S110, on determination that the sum of the exhaust airflow volume of the ventilation device 30 and the exhaust airflow volume of the auxiliary exhaust fan 62 is equal to or less than the lower limit exhaust airflow volume, the CPU 361 sends a signal to the central controller 40. On receipt of the signal indicating that at least one of the supply airflow volume and the exhaust airflow volume is equal to or less than the lower limit value, the CPU 401 of the central controller 40 sets the operation of the compressor 13 to the stop state and causes the display unit 51 to issue an alarm.

As described above, by activating the auxiliary fan 60, it is possible to compensate for the reduced airflow volume of the ventilation device 30. In addition, the CPU 401 may start the operation of the auxiliary fan 60 and cause the display unit 51 of the remote controller 50 to issue an advance alarm different from the above-described alarm. By issuing the advance alarm, before the forced stop of the indoor unit 20 in operation, the service technician or user can be notified of the fault of the ventilation device to take measures to solve the fault. The advance alarm can be issued, in the same manner as the above-described alarm, by displaying a statement indicating that the decrease in the airflow volume of the ventilation device 30 is approaching a danger zone, or flashing a phrase such as "caution: airflow volume of ventilation device has decreased" or a symbol indicating content thereof.

In addition, when the lower limit value of at least one of the supply airflow volume and the exhaust airflow volume cannot be secured even with the assistance of the airflow volume by the auxiliary fan 60, the CPU 401 sets the operation of the compressor 13 to the stop state and causes the display unit 51 to issue an alarm. This makes it possible to notify the service technician or user that the normal ventilation airflow volume is not secured and to urge the solution of the fault of the ventilation device 30. Therefore, it is possible to inhibit the shortage of the airflow volume of the ventilation device 30 if the refrigerant leaks.

Here, the "second predetermined value" is a value greater than the "lower limit supply airflow volume" and the "lower limit exhaust airflow volume" ("first predetermined value"), and can be, for example, a value of 105 to 110% of the required ventilation capacity calculated by Formula (1). Specifically, when 105% of the value calculated in the above calculation example is the second predetermined value, the second predetermined value is $163 \times 1.05 = 171.15$ m³/h. Therefore, when the control unit 36 determines that at least one of the supply airflow volume and the exhaust airflow volume is 171.15 m³/h or less, the operation of the auxiliary fan 60 is started. Note that the "second predetermined value" of the supply airflow volume and the exhaust airflow volume, which is the same value in the above description, may be different values.

Modification 2

In the air conditioning and ventilating system S in modification 2, in the control of FIG. 5, before at least one of the supply airflow volume and the exhaust airflow volume becomes equal to or less than the lower limit value and the operation of the air conditioning device A is set to the stop state, the "advance alarm" to notify the service technician or user that the ventilation airflow volume is decreasing may be issued. The timing for issuing the advance alarm may be the same as the timing for starting the operation of the auxiliary fan 60 in modification 1. That is, this may be the case where the CPU 361 of the control unit 36 determines that at least one of the supply airflow volume and the exhaust airflow volume of the ventilation device 30 is greater than the first predetermined value (lower limit supply airflow volume, lower limit exhaust airflow volume), and is equal to or less than the second predetermined value greater than the first predetermined value. The contents of the advance alarm are the same as in modification 1.

By issuing the advance alarm by the display unit 51, the service technician or user can understand that the ventilation device 30 has a fault and does not secure normal ventilation airflow volume, and that the airflow volume decrease is approaching a danger zone. By notifying the service technician or user of the fault of the ventilation device 30 and urging the solution of the fault before the forced stop of the air conditioning device in operation, it is possible to avoid the inconvenience caused by the forced stop of the air conditioning device.

Modification 3

In the air conditioning and ventilating system S in modification 3, the supply airflow volume detection unit 37 and the exhaust airflow volume detection unit 38 may each be a sensor that measures power consumption of each motor (not shown) that activates the supply air fan 34 and the exhaust fan 35. When the power consumption sensor is used, the airflow volume equivalent value may be, for example, a power value corresponding to the power consumption. When the power consumption sensor is used as the supply airflow volume detection unit 37 and the exhaust airflow volume detection unit 38, the following data will be stored in the storage unit 362 in advance as the target supply airflow volume and the target exhaust airflow volume. Specifically, the storage unit 362 stores in advance data that associates the multi-level number of revolutions of the supply air motor implementing the target supply airflow volume with the power value corresponding to the number of revolutions. In addition, the storage unit 362 stores in advance data that associates the multi-level number of revolutions of the exhaust air motor implementing the target exhaust airflow volume with the power value corresponding to the number of revolutions.

When the airflow volume of the ventilation device 30 decreases, the following processing may be executed. The control unit 36 acquires the power consumption of the supply air motor from the supply airflow volume detection unit 37, and acquires the power consumption of the exhaust motor from the exhaust airflow volume detection unit 38. When the power consumption is less than the power value associated with the current number of revolutions beyond the predetermined range, the CPU 361 of the control unit 36 determines whether the power consumption is equal to or less than the lower limit value. When the power consumption is not equal to or less than the lower limit value, the CPU 361 increases the number of revolutions of the supply air fan 34 and the exhaust fan 35. When the power consumption is equal to or less than the lower limit value, the air conditioning and ventilating system S of the present modification executes the processing of step S107, step S112, and below in FIG. 5.

Modification 4

In the air conditioning and ventilating system S in modification 4, when the CPU 361 of the control unit 36 determines that at least one of the supply airflow volume and the exhaust airflow volume is equal to or less than the lower limit value, the CPU 401 of the central controller 40 may prohibit the operation manipulation of the indoor unit 20 with the remote controller 50. In more detail, when the CPU 361 of the control unit 36 determines that at least one of the supply airflow volume and the exhaust airflow volume is equal to or less than the lower limit value, the CPU 401 of the central controller 40 prohibits the operation manipulation of the indoor unit 20 with the remote controller 50. This prevents, for example, the user from operating the indoor unit 20 even though the ventilation device 30 has a fault and needs maintenance. As a result, it is possible to urge maintenance more reliably for solving the fault of the ventilation device 30.

In addition, when the solution information is input, the CPU 401 of the central controller 40 may permit the operation manipulation of the indoor unit 20 with the remote controller 50. The solution information can be input into the remote controller 50, for example, by the service technician who confirms that the fault of the ventilation device 30 has been solved switching the remote controller 50 to the maintenance mode in which only the service technician can confirm the input.

Action and Effect of the Present Embodiment

Patent Literature 1 describes the operations of the ventilation device and the air conditioning device when the refrigerant actually leaks, but does not disclose securing the airflow volume of the ventilation device as a safety device in case the refrigerant leaks. An object of the present disclosure is to provide an air conditioning and ventilating system that can inhibit the shortage of airflow volume of the ventilation device when the refrigerant leaks.

In the present disclosure, on determination that the airflow volume equivalent value of the ventilation device 30 is equal to or less than the first predetermined value, the CPU 401 of the central controller 40 sets the operation of the air conditioning device A to the stop state. This makes it possible to inhibit the shortage of the airflow volume of the ventilation device 30 if the refrigerant leaks. Note that setting the operation of the air conditioning device A to the stop state means setting the operation of the compressor 13 of the outdoor unit 10 to the stop state.

In addition, in the present disclosure, the CPU 361 of the control unit 36 executes the fixed airflow volume control that adjusts the number of revolutions of the supply air fan 34 and the exhaust fan 35 to cause the supply airflow volume equivalent value and the exhaust airflow volume equivalent value to approach respective target values. When the CPU 361 of the control unit 36 determines that at least one of the supply airflow volume equivalent value and the exhaust airflow volume equivalent value is equal to or less than the first predetermined value during the fixed airflow volume control, the CPU 401 of the central controller 40 sets the operation of the air conditioning device A to the stop state. This makes it possible to inhibit the shortage of the airflow volume of the ventilation device 30 if the refrigerant leaks. In addition, the CPU 401 of the central controller 40 sets the operation of the air conditioning device A to the stop state, and causes the display unit 51 of the remote controller 50 to issue an alarm. It is possible to notify the service technician or user of the fault of the ventilation device and take measures to solve the fault.

In addition, in the present disclosure, when the CPU 361 of the control unit 36 determines that at least one of the supply airflow volume equivalent value and the exhaust airflow volume equivalent value is greater than the first predetermined value and equal to or less than the second predetermined value greater than the first predetermined value, the CPU 401 of the central controller 40 causes the display unit 51 of the remote controller 50 to issue an advance alarm. This makes it possible to notify the service technician or user of the fault of the ventilation device and take measures to solve the fault before the forced stop of the air conditioning device A in operation.

In addition, in the present disclosure, when the CPU 361 of the control unit 36 determines that at least one of the supply airflow volume equivalent value and the exhaust airflow volume equivalent value is equal to or less than the first predetermined value, the CPU 401 of the central controller 40 prohibits the operation manipulation of the air conditioning device A with the remote controller 50. This prevents, for example, the user from operating the air conditioning device A even though the ventilation device 30 has a fault and needs maintenance, and as a result, it is possible to urge maintenance more reliably for solving the fault of the ventilation device 30.

In addition, in the present disclosure, when the CPU 361 of the control unit 36 determines that at least one of the supply airflow volume equivalent value and the exhaust airflow volume equivalent value is greater than the first predetermined value and equal to or less than the second predetermined value greater than the first predetermined value, the CPU 401 of the central controller 40 activates the auxiliary fan 60. By activating the auxiliary fan 60, it is possible to compensate for the reduced airflow volume of the ventilation device 30.

In addition, in the present disclosure, when the CPU 361 of the control unit 36 determines that at least one of the sum of the supply airflow volume equivalent value and the supply airflow volume equivalent value of the auxiliary fan and the sum of the exhaust airflow volume equivalent value and the exhaust airflow volume equivalent value of the auxiliary fan is equal to or less than the first predetermined value, the CPU 401 of the central controller 40 sets the operation of the air conditioning device A to the stop state. By setting the operation of the air conditioning device A to the stop state when at least one of the sum of the supply airflow volume equivalent value and the sum of the exhaust airflow volume equivalent value cannot secure the first predetermined value even with the assistance of the airflow volume by the auxiliary fan 60, it is possible to notify the service technician or user that normal ventilation airflow volume is not secured and to urge the solution of the fault of the ventilation device 30. This makes it possible to inhibit the shortage of the airflow volume of the ventilation device 30 if the refrigerant leaks.

In addition, in the present disclosure, the supply airflow volume by the supply air fan 34 and the exhaust airflow volume by the exhaust fan 35 are determined based on the number of revolutions and power consumption of the supply air fan 34 and the number of revolutions and power consumption of the exhaust fan 35, respectively. By using the airflow volume determined based on the number of revolutions and the power consumption of the fan, it is possible to determine whether the airflow volume is equal to or less than the first predetermined value.

Other Modifications

The present disclosure is not limited to the above-described embodiment, and various modifications may be made within the scope of the claims.

For example, in the above-described embodiment, the number of outdoor units is one, but two or more outdoor units can be adopted. The number and arrangement of the outdoor unit, the indoor unit, and the ventilation device are not particularly limited in the present disclosure, and can be appropriately selected to constitute the air conditioning and ventilating system.

In addition, in the above-described embodiment, when at least one of the supply airflow volume and the exhaust airflow volume becomes equal to or less than the lower limit, the CPU 401 of the central controller 40 sets the operation of the air conditioning device A to the stop state, but the present disclosure is not limited to this example. When both the supply airflow volume and the exhaust airflow volume becomes equal to or less than the lower limit, the CPU 401 may set the operation of the air conditioning device A to the stop state. The same applies to the case where the auxiliary fan 60 is provided in modification 1.

In addition, in the above-described embodiment, the supply airflow volume and the exhaust airflow volume are obtained from the airflow volume sensor or from the power consumption and the number of revolutions of the motors of the supply air fan and the exhaust fan, but the present disclosure is not limited to this example, and the ventilation airflow volume can be obtained by other methods. For example, the ventilation airflow volume can be obtained from the cross-sectional area of the duct where air is supplied or exhausted and the wind speed of the wind flowing through the duct detected by the sensor. In addition, it is also possible to pass air through a nozzle whose cross-sectional area is known in advance and to obtain the airflow volume flowing through the nozzle based on the pressure difference (pressure drop) between an inlet and outlet of the nozzle.

In addition, in the above-described embodiment, the orthogonal total heat exchanger is disposed in the ventilation device, but a rotary total heat exchanger that recovers heat from the return air by rotating a rotor can also be adopted. In addition, the adoption of such a total heat exchanger in the ventilation device can also be omitted.

In addition, in the above-described embodiment, the auxiliary fan 60 includes the auxiliary supply air fan that supplies air into the room and the auxiliary exhaust fan that discharges air from the room, but instead of these fans, only the auxiliary supply air fan that supplies air into the room may be provided, or only the auxiliary exhaust fan that exhausts air from the room can be provided.

In addition, in the above-described embodiment, the display unit of the remote controller functions as an alarm unit to issue an alarm with text information, symbol, and the like, but in addition to the visual alarm, or along with the visual alarm, a voice alarm that appeals to the auditory sense can be used.

REFERENCE SIGNS LIST 10 outdoor unit
11 liquid refrigerant pipe
12 gas refrigerant pipe
13 compressor
14 four-way switching valve
15 outdoor heat exchanger
16 outdoor expansion valve
17 liquid shutoff valve
18 gas shutoff valve
19 outdoor fan
20 indoor unit
21 indoor expansion valve
22 indoor heat exchanger
23 indoor fan
24 refrigerant sensor
25 control unit
30 ventilation device
31 supply air duct
32 return air duct
33 total heat exchanger
34 supply air fan
35 exhaust fan
36 control unit
37 supply airflow volume detection unit
38 exhaust airflow volume detection unit
40 central controller
50 remote controller
51 display unit
52 control unit
53 input unit
60 auxiliary fan
61 auxiliary supply air fan
62 auxiliary exhaust fan
63 blast duct
64 blast duct
65 electric damper
66 electric damper
67 control unit
251 CPU
252 storage unit
253 transmission and reception unit
361 CPU
362 storage unit
363 transmission and reception unit
401 CPU
402 storage unit
403 transmission and reception unit
411 CPU
412 storage unit
413 transmission and reception unit
521 CPU
522 storage unit
523 transmission and reception unit
671 CPU
672 storage unit
673 transmission and reception unit
A air conditioning device
R room (air conditioned space)

The invention claimed is:

1. An air conditioning and ventilating system comprising:
an air conditioning device including a compressor and a heat exchanger configured to generate conditioned air by heat exchange with a refrigerant;
a ventilation device communicatively connected to the air conditioning device and including a supply air fan or an exhaust fan, the ventilation device configured to supply outside air to a room and to exhaust air in the room to outside the room;
an airflow volume detector configured to detect an airflow volume equivalent value of the ventilation device;
a display configured to issue an alarm based on the detected airflow volume equivalent value; and
a controller comprising a processor,
wherein on determination that the airflow volume equivalent value acquired from the airflow volume detector is equal to or less than a first predetermined value, the processor of the controller sets an operation of the air conditioning device to a stop state by stopping the compressor,
the first predetermined value is an airflow volume equivalent value corresponding to a ventilation amount required to take safety measures against refrigerant leakage by ventilation, and
the processor of the controller causes the display to issue the alarm on determination that the detected airflow volume equivalent value is greater than the first predetermined value and equal to or less than a second predetermined value greater than the first predetermined value.

2. The air conditioning and ventilating system according to claim 1, wherein
the ventilation device includes the supply air fan configured to supply the outside air to the room and the exhaust fan configured to exhaust the air in the room to outside the room,
the airflow volume detector includes a supply airflow volume detector configured to detect a supply airflow volume equivalent value by the supply air fan, and an exhaust airflow volume detector configured to detect an exhaust airflow volume equivalent value by the exhaust fan, and
the processor of the controller executes fixed airflow volume control to adjust a number of revolutions of the supply air fan and the exhaust fan to cause the supply airflow volume equivalent value and the exhaust airflow volume equivalent value to approach respective target airflow volumes, and sets the operation of the air conditioning device to the stop state on determination that at least one of the supply airflow volume equivalent value and the exhaust airflow volume equivalent value is equal to or less than the first predetermined value during the fixed airflow volume control.

3. The air conditioning and ventilating system according to claim 2,
wherein the processor of the controller causes the display to issue the alarm on determination that at least one of the supply airflow volume equivalent value and the exhaust airflow volume equivalent value is greater than the first predetermined value and equal to or less than a second predetermined value greater than the first predetermined value.

4. The air conditioning and ventilating system according to claim 3, further comprising an auxiliary fan configured to supplement a ventilation airflow volume, wherein on determination that at least one of the supply airflow volume equivalent value and the exhaust airflow volume equivalent value is greater than the first predetermined value and equal to or less than the second predetermined value greater than the first predetermined value, the processor of the controller activates the auxiliary fan.

5. The air conditioning and ventilating system according to claim 4, wherein on determination that at least one of a sum of the supply airflow volume equivalent value and a supply airflow volume equivalent value of the auxiliary fan and a sum of the exhaust airflow volume equivalent value and an exhaust airflow volume equivalent value of the auxiliary fan is equal to or less than the first predetermined value, the processor of the controller sets the operation of the air conditioning device to the stop state.

6. The air conditioning and ventilating system according to claim 2, further comprising a remote controller comprising a processor configured to manipulate the operation of the air conditioning device,
wherein on determination that at least one of the supply airflow volume equivalent value and the exhaust airflow volume equivalent value is equal to or less than the first predetermined value, the processor of the controller prohibits the operation manipulation with the remote controller.

7. The air conditioning and ventilating system according to claim 2, wherein a supply airflow volume by the supply air fan and an exhaust airflow volume by the exhaust fan are determined based on the number of revolutions and power consumption of the supply air fan and the number of revolutions and power consumption of the exhaust fan, respectively.

8. The air conditioning and ventilating system according to claim 1, further comprising a remote controller comprising a processor configured to manipulate the operation of the air conditioning device,
wherein on determination that the airflow volume equivalent value acquired from the airflow volume detector is equal to or less than the first predetermined value, the processor of the controller prohibits the operation manipulation with the remote controller.

9. The air conditioning and ventilating system according to claim 1, wherein upon determining that the airflow volume equivalent value acquired from the airflow volume detector is equal to or less than a third predetermined value and greater than the first predetermined value, the processor of the controller increases the number of revolutions of at least one of the supply air fan and the exhaust fan, and upon determining, after increasing the number of revolutions, that the airflow volume equivalent value is equal to or less than the first predetermined value, the processor of the controller sets the operation of the air conditioning device to the stop state.

* * * * *